April 11, 1967          P. PATIN          3,313,063

VEHICLE COMPRISING A DOOR CONNECTED TO THE BODY BY LEVERS

Filed Aug. 17, 1964

United States Patent Office 3,313,063
Patented Apr. 11, 1967

3,313,063
VEHICLE COMPRISING A DOOR CONNECTED TO THE BODY BY LEVERS
Pierre Patin, Boulogne, France, assignor to Compagnie d'Ingenieurs et Techniciens d'Etudes, Paris, France, a French company
Filed Aug. 17, 1964, Ser. No. 389,884
Claims priority, application France, Aug. 20, 1963, 945,077
3 Claims. (Cl. 49—249)

This invention relates to a vehicle comprising a door connected to the body by levers articulated on substantially vertical axes to the body and the door respectively.

Vehicles of this type have the advantage that when the door is opened the same occupies relatively little space laterally of the vehicle. By means of the levers the door opens with a parallel movement to itself and occupies very little space laterally.

The invention relates to improvements to this type of vehicle and more particularly is characterised in that each of the levers is articulated about a substantially vertical axis at a point situated between its ends.

The invention will now be described with reference to a specific embodiment given by way of example and illustrated in the drawings.

Additional features of the invention will be apparent from the following description.

Figure 1:
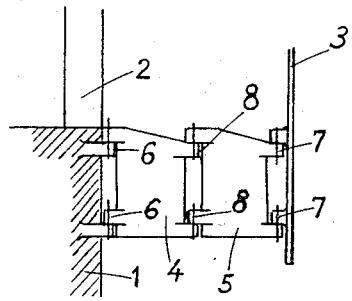
FIG. 1 is a highly diagrammatic section of a vehicle through a vertical plane perpendicular to its longitudinal axis, and shows the bottom part of the door and one articulated lever.

FIG. 1 is a highly diagrammatic view of the body substructure 1 having a door aperture 2, the aperture being closed by a door 3 connected to the body 1 by levers and, according to the invention, each of the said levers is articulated at a point situated between its ends.

FIG. 1 shows the two parts 4 and 5 of the lever. Part 4 is articulated on the body adjacent the door aperture about a substantially vertical axis 6 while part 5 is articulated on the door 3 about a vertical axis 7.

The two parts 4 and 5 are articulated together by a vertical axis 8.

Figure 2:
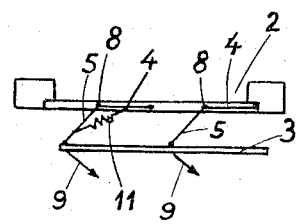
FIGS. 2 to 5 are highly diagrammatic plan views showing various stages in the opening of the door.

FIG. 2 is a plan view showing the door aperture 2, the door moving in parallel relationship to itself during a first stage of the opening operation.

During this stage, the two parts 4 and 5 pivot and are loaded by a spring 11 for this pivoting movement.

FIG. 2 shows a case in which the door 3 is connected to the body by two spaced levers, one such lever being articulated about an axis situated at the edge of the aperture while the other is articulated about an axis situated towards the centre of the aperture width.

When the door is applied to the body to close the aperture 2, catch devices hold the parts 4 and 5 of the levers in the required position in which one forms a continuation of the other.

When the door begins to open, the parts 5 of the levers pivot about the axes 8 in the direction of the arrows 9, the catches holding the parts 4 in the plane of aperture.

Figure 3:
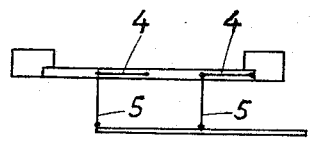
Figure 6:
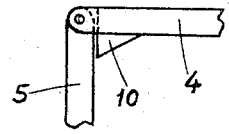
FIG. 6 shows a stop for the articulated lever.

When the parts 5 have pivoted to a certain amount, for example 90° in the case of FIG. 3, a stop 10 comes into operation to stop the further movement of the parts 4 and 5 in relation to one another. FIG. 6 shows such a stop, which can simply be an angle-member rigidly secured to one of the two parts 4 and 5.

Of course the stop could be arranged for an angle other than 90°; for example it could allow the parts 4 and 5 to form an angle of 60° with one another. The smaller the angle, the closer the door to the vehicle body on opening and the less space it occupies outside the vehicle body.

Figure 4:
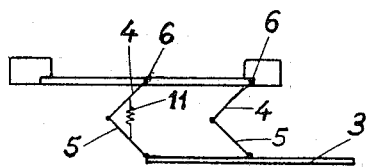

FIG. 4 shows the stage of operation beginning after the catches which hold the parts 4 of the levers in the apertures plane have stopped operating.

Figure 5:
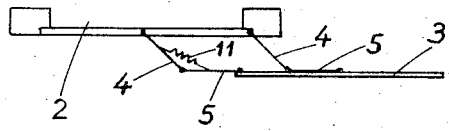

The levers which are held in their pivoted position by the spring 11 then pivot about the axes 6. As the movement continues, the opening stage shown in FIG. 5 is reached, during which the parts 4 and 5 unfold and tension the spring 11 until the door 3 is applied against the body, thus completely freeing the aperture 2.

Figure 7:
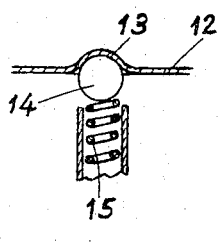
FIG. 7 is a diagrammatic section showing an automatic catch mechanism for use with the articulated levers according to the invention.

FIG. 7 is an example of a catch which can be used to hold the part 4 of the levers in the aperture plane or to hold the part 5 in the door plane (FIG. 5) during the last stage of the opening.

This catch can be formed simply by a plate 12, part of which (13) is dished to form the housing for a ball 14 loaded by a spring 15. To disengage the catch, the same is simply slightly forced to move the ball 14 and its spring with respect to the plate 12 thus disengaging the ball from the housing in the plate. A device of this kind has a sufficient retaining action without the action being excessive and obstructive to the door opening.

When it is required to close the door, the above-described opening stages are repeated in the reverse sequence.

The invention is naturally limited to the above-described details of embodiment, which could be modified without thereby departing from the scope of the invention.

I claim:

1. A vehicle having a body, a door opening and a door, hinge means for connecting said door to said body for movement of said door from closed to open position substantially parallel to the plane of the door comprising two parallel levers horizontally spaced in the door opening articulated about two substantially vertical axes on the body and on the door, respectively, each of said levers comprising two parts articulated together at adjacent ends about a third movable substantially vertical axis located between said two substantially vertical axes.

2. A vehicle as described in claim 1 including a resilient element connecting the parts of each of said levers urging said parts toward each other about their axis of articulation.

3. A vehicle as described in claim 1 including a stop between the two parts of at least one of said levers limiting the closing articulation thereof.

References Cited by the Examiner
UNITED STATES PATENTS

| | | | |
|---|---|---|---|
| 114,102 | 4/1871 | Bradley | 49—249 |
| 2,956,836 | 10/1960 | James | 49—246 X |
| 3,075,803 | 1/1963 | Wilfert | 49—216 X |
| 3,195,173 | 7/1965 | McNay. | |
| 3,213,485 | 10/1965 | McNay. | |

FOREIGN PATENTS

| | | |
|---|---|---|
| 1,049,428 | 8/1953 | France. |
| 698,835 | 10/1953 | Great Britain. |

BENJAMIN HERSH, *Primary Examiner.*
P. GOODMAN, *Assistant Examiner.*